United States Patent Office 3,082,192
Patented Mar. 19, 1963

3,082,192
HYDROXYLATION OF POLYMERS OF
MONO-OLEFINS
Isidor Kirshenbaum, Westfield, Jeffrey H. Bartlett, New Providence, and Ralph M. Hill, Mountainside, N.J., assignors to Esso Research and Engineering Company, a corporation of Delaware
No Drawing. Filed Dec. 18, 1959, Ser. No. 860,323
19 Claims. (Cl. 260—88.2)

This invention relates to a novel process for increasing the functionality of hydrocarbon polymers of mono-olefin monomers by oxidation with molecular oxygen in the presence of a boric acid compound. In particular this invention relates to a process for hydroxylating polymers prepared by the polymerization of $C_2$-$C_{12}$ mono-olefins such as ethylene, propylene, butene-1, heptene-1, dodecene-1, etc. More particularly the invention relates to the air oxidation of such polymers in the presence of boric acid. Such polymers exhibit a high degree of saturation and have the tendency to degrade when oxidized by conventional methods with pronounced changes in molecular weights and/or viscosity. The oxygenated materials resulting from conventional air oxidation of such polymers apparently contain oxygen as a part of carbonyl groups.

It has now been discovered that the polymer degradation incidental to conventional methods of oxidizing polymers of mono-olefins can be minimized and oxygen introduced into such polymers in the form of hydroxyl groups by carrying out the oxidation in accordance with this invention in the presence of a boric acid compound.

One embodiment of this invention involves hydroxylating polymers prepared by the now well-known process of polymerizing such mono-olefins with catalyst systems made up of partially reduced, reducible, heavy transition metal compounds and a reducing metal-containing compound to high density, isotactic, high molecular weight, solid, relatively linear products, e.g. see Belgian Patent 538,782, issued June 8, 1954, and "Scientific American," September 1957, page 98 et seq. These polymers have molecular weights in the range of about 50,000 to 300,000 or even as high as 3,000,000 as determined by the intrinsic viscosity method using the I. Harris correlation (J. Polymer Science, 8, 361, 1952). The crystalline polymer is substantially insoluble in the usual hydrocarbon solvents such as paraffins, e.g. heptane.

Another embodiment of this invention involves the introduction of hydroxyl groups into the relatively low molecular weight polymers, i.e. molecular weights in the range of 500 to 50,000, of mono-olefins which are liquids or soft amorphous solids. Polymers of this type are quite soluble in paraffinic solvents, e.g. heptane, and can be prepared by the polymerization of mono-olefin monomers through the use of polymerization catalysts such as aluminum trichloride, boron trifluoride, and the like.

Thus, the polymers within the purview of this invention may be polymers of a single monomeric compound (homopolymers), e.g. polyethylene, polypropylene, etc., or copolymers, terpolymers, tetrapolymers, etc. of olefins of different molecular weight, e.g. copolymers of ethylene and propylene. Likewise, where the polymer is prepared from two or more olefin monomers of different molecular weight, the monomer having the lowest molecular weight may combine with a lesser, greater or equal amount of the other monomer or monomers.

In a preferred method for producing the aforementioned high molecular weight, high density, polymers, e.g. polyethylene, polypropylene, copolymers of ethylene and propylene, etc., the catalyst system desirably utilized comprises the so-called preformed, at least partially crystalline, partially reduced, heavy transition metal halides.

The metals are thus the transition metals of the groups IVB, VB, VIB, and VIII of the periodic system, e.g. titanium, zirconium, hafnium, thorium, uranium, vanadium, niobium, tantalum, chromium, molybdenum, tungsten, as well as iron and copper. The chlorides and bromides are generally preferred, titanium and zirconium being the most active. The following heavy metal compounds are readily reducible requiring only low activation temperatures, titanium tetrachloride, titanium tetrabromide, zirconium tetrachloride and zirconium tetrabromide.

While the reduced metal halide, e.g. $TiCl_3$, itself has some catalyst activity, the latter is enhanced by the addition of an aluminum compound having the formula $R,R'AlX$. In this formula $R,R'$ and $X$ preferably are alkyl groups of 2 to 8 carbon atoms, although $X$ may alternately be hydrogen or a halogen, notably chlorine.

The resulting activated dispersed catalyst is then ready for use in the polymerization of olefins. This is preferably carried out by adding the olefin, in either gaseous or liquid state, directly to the reactor containing the dispersed catalyst in the diluent, preferably with constant agitation.

The monomers may then be contacted with the catalyst in the presence of inert hydrocarbon solvents such as isopentane, n-heptane, xylene, etc. The polymerization is conveniently effected at temperatures in the range of about 0° to 100° C. and pressures ranging from 0 to 500 p.s.i.g., usually 0 to 50 p.s.i.g. The catalyst concentrations may vary with the feedstock but in general concentrations in the range of about 0.1 to 0.5% based on total liquid in the polymerization zone are adequate. The polymer product concentration in the polymerization zone is preferably kept between about 2 and 25% based on total contents so as to allow easy handling of the polymerized mixture. When the desired degree of polymerization has been reached, a $C_1$ to $C_8$ alkanol such as isopropyl alcohol or n-butyl alcohol, desirably in combination with a chelating agent such as acetyl acetone is normally added to the reaction mixture for the purpose of dissolving and deactivating the catalyst and for precipitating the polymer product from solution. After filtration, the solid polymer may be further washed with alcohol or acid such as hydrochloric acid, dried, compacted and packaged.

The preparation of the lower molecular weight polymers of mono-olefins with catalysts such as aluminum trichloride, boron trifluoride and the like is old in the art and the literature is replete with various modifications of catalyst and polymerization conditions for processes of this type. One such process of this type employs an aluminum trichloride sludge prepared by admixing aluminum trichloride and decene-1 in a paraffinic diluent such as n-heptane to catalyze a reaction wherein mono-olefins are polymerized at elevated pressures, e.g. 800 lbs./in.$^2$.

Various modifications of these and other processes are known to the art for producing polyethylenes, polypropylenes, etc. These include both the so-called "high pressure" and "low pressure" processes along with processes distinguished by catalyst variations among which are the so-called "metal oxide" catalysts. Examples of a few of these are found in U.S. Patents 2,827,446, 2,728,758, 2,727,024; Belgian Patents Nos. 533,362, 534,792, 534,888; Italian Patent No. 526,101 and many others.

The polymer feedstocks as hereinbefore defined are not limited to those prepared by any specific catalyst or process variable.

The term "boric acid compound" is used herein to designate boric acid, i.e. $H_3BO_3$, and boron containing compounds which generate boric acid upon contact with water, e.g. boric oxide, i.e. $B_2O_3$; borate esters, e.g. trimethylborate, tributylborate, etc.; alkylboric acids, i.e. $R_2BOH$ (borinic acids) and $RB(OH)_2$ (boronic acids) wherein R is an alkyl radical, preferably a $C_3$-$C_8$ alkyl radical; and the esters of boronic and borinic acids with $C_1$ to $C_4$ alcohols. For an explanation of the properties of the aforementioned boric acid compounds, see "The Chemistry of Organometallic Compounds," Rochow, Hurd & Lewis, 1957, by John Wiley & Sons, Inc., New York and London, pages 127–129.

The amount of boric acid employed in this process may vary somewhat, depending upon the feedstock and the end product desired. In general, the amount of boric acid employed should be in excess of the amount that would be stoichiometrically equivalent to the number of hydroxyl groups to be introduced. When using the other boron compounds disclosed herein, a chemically equivalent amount is used. It should be understood that 1 mole of $H_3BO_3$, a tribasic acid, is considered as constituting three chemical equivalents. The same is true of the borate esters hereinbefore mentioned. Broadly speaking, the amount of boron compound employed can vary from as little as 0.02 wt. percent up to 25 wt. percent based on the weight of the polymer. In the case of boric acid the present invention gives useful results when employing concentrations which fall in the range of 0.2 to 20.0, preferably 3 to 10, wt. percent based on the weight of polymer feedstock. The use of the higher portion of this range is particularly of interest when comparatively large quantities of inert diluent are employed.

According to one embodiment of this invention a polymer feedstock as hereinbefore described is dissolved in a suitable inert solvent and contacted with molecular oxygen in the presence of $H_3BO_3$. The polymer is oxidized at a temperature in the range of 100° to 250° C., preferably between 150° and 185° C. The oxidation may be carried out at pressures ranging from about atmospheric or below to 200 atmospheres or higher, preferably about 1 to 10 atmospheres. The oxidation may be continued until the desired amount of oxygen is introduced into the polymer. However, for most purposes the oxidation should be terminated when the polymer contains on the average between about 0.01 and 1, preferably 0.05 to 0.5, OH groups per 10 carbon atoms of the polymer molecule. In some cases the oxidized product may be left in the form of the borate ester. The time required for introducing such amounts of oxygen into the polymer will, of course, vary with the degree of dilution of the polymer in solution, the percentage of oxygen in the oxidizing gas and the conditions of reaction, i.e. temperature and pressure, etc. The oxygen intake by the polymer or polymer solution may be followed by an $O_2$ analysis of the exit gas. The use of an oxidation catalyst is optional. It is preferred in some embodiments to use oxidation catalysts which include compounds of cobalt, manganese, and similar metals. One embodiment involves the use of bromide catalysts such as ammonium bromide, HBr, $MnBr_2$ isopropyl bromide, etc. Although less desirable the corresponding chlorides may be used in place of or in conjunction with the bromides. Bromide concentration of 0.1–10 wt. percent (calculated as ammonium bromide and based upon the polymer feedstock) may be used, although preferred concentrations when using bromide additions are 0.5–2 wt. percent. With some feedstocks there may be advantages of introducing small amounts of oxidation initiators such as peroxides, hydroperoxides, ketones such as methyl ethyl ketone, etc.

The solvent or diluent should preferably be chemically inert to the oxidation at the temperatures of reaction and below. Suitable organic solvents for use in this invention include benzene, chlorobenzene, bromobenzene, dichlorobenzene, etc. Other solvents which are inert to oxidation at the conditions of reaction and do not react with or catalyze reactions between or within the reactants and products may also be used.

The concentration of polymer in the solvent will depend upon the type of reactor, molecular weight of the polymer, etc. In general, the concentration of a polymer having a viscosity average molecular weight of about 200,000 to about 1,000,000 or more, will ordinarily be between 1 and 30% by weight, preferably about 5 to 20%. With liquid polymers, e.g. polyethylene having a molecular weight of about 500 or higher, the reaction may be carried out without the use of a solvent or diluent although even with these lower molecular weight polymers the use of a solvent is preferred.

Oxygen may be introduced into the solution of polymer as air, undiluted molecular oxygen or preferably as air diluted with an inert gas. If either undiluted oxygen or a mixture wherein the mole percentage of oxygen is high is employed as the oxidant the need for diluting the solution of polymer as hereinbefore set forth is more pronounced. In some embodiments of the invention it is advantageous to employ a mixture of oxygen and an inert gas wherein the mole percentage of oxygen is lower than the percentage of oxygen in air. In general, it is preferred to use a gas mixture containing 3–6 vol. percent oxygen and correspondingly 97–94 vol. percent of an inert gas such as nitrogen.

Prior to oxidizing the polymer, it may be desirable to extract or otherwise remove contaminants which tend to interfere with the oxidation reaction. For instance, it may be desirable to extract any antioxidant before the oxidation is begun, since removal of such materials tends to reduce the induction period. Qualitative evaluations of the oxidized product show it contains a substantial number of hydroxyl groups.

With this introduction of hydroxyl groups into the polymer the reactivity of the polymer is greatly enhanced permitting cross-linking, graft polymerization, etc., and the use of the resulting polymers for preparation of lubricating oil additives, agricultural chemical applications, etc.

While the following examples serve to illustrate the invention, they are not to be construed as limitations thereof.

EXAMPLE 1

A polymerization catalyst is prepared by adding about 153 grams of aluminum trichloride, 1660 grams of n-heptane and 161.5 grams of decene-1 to a closed reactor under a nitrogen pressure of about 100 lbs./in.² An exothermic reaction occurs. When the temperature in the reactor drops to about 120° C. ethylene is pumped into the reactor at a pressure of about 800 lbs./in.² Pressure changes occur and the ethylene is fed intermittently for about 2 hours so as to maintain the pressure in the reactor at about 800 lbs./in.² A total of about 1234 grams of ethylene are fed to the reactor. Heptane and lower boiling materials are removed from the reaction mixture. The temperature of the reaction mixture is maintained in the range of 100°–120° C.

The product is allowed to settle to remove the catalyst complex and the upper layer is decanted and water washed. The product is then stripped at a pot temperature of 200° C. at 1 mm. Hg. A polyethylene polymer is recovered having a viscosity average molecular weight of 525.

Into a 2 liter 4-neck flask equipped with a thermometer, stirrer, gas dispersion tube, and condenser with water trap is placed 493.5 grams of the 525 mol. wt. polymer having a pour point of about −20° F. and 15 grams of boric acid. Through a gas inlet a mixture of air and nitrogen is introduced into the flask. The reaction is carried out at atmospheric pressure and the temperature is maintained between 160°–170° C. The air and nitrogen are introduced over a period of about 4 hours or until 25.7 cu. ft. of air and 26.3 cubic feet of nitrogen has been introduced into the flask. The progress of the reaction is followed by measuring the water removed with the exit gas. The oxidation is discontinued and the reaction mixture allowed to cool. Then 1 liter of methanol is added to the reaction mixture at a temperature of about 50° C. The resulting admixture is refluxed for about 1½ hours with the condenser maintained so as to allow the escape of materials boiling below about 65° C. A methyl borate-methanol mixture is thus allowed to escape. The residue is dissolved in a 1 liter of petroleum ether and water washed about 3 times. The residue is then stripped to 170° C., pot temperature, at .4 mm. Hg to remove traces of boric acid, water, etc. The remaining product is analyzed and found to have a hydroxyl number of 21.08 mgm. KOH per gram and a saponification number of 5.47 mgm. KOH per gram, thus indicating that approximately 80% of the oxygen introduced into the polymer is introduced in the form of hydroxyl groups. The molecular weight of the oxidized polymer is found to be increased to about 614.

For comparison a second aliquot of the same polymer is oxidized in the same manner as before except that boric acid is not added to the reaction mixture. The oxidized polymer is analyzed and is found to have a hydroxyl number of 3.06 mgm. KOH per gram and a saponification number of 6.60 mgm. KOH per gram, and a molecular weight of 268.

EXAMPLE 2

A copolymer of 92% propylene and 8% ethylene having a density of .894, a melting point of 152° C., a molecular weight of 115,000 (determined by the measurement of the intrinsic viscosity of the polymer in tetralin at 125° C. This value was then correlated with Harris (J. Polymer Science, 8, 361 (1952)), prepared by polymerizing the aforesaid olefins in the presence of an $AlEt_3$—$TiCl_3$ catalyst in accordance with the method hereinbefore described in column 2, is oxidized according to the following procedure.

About 150 grams of the polymer is dissolved in dichlorobenzene at about 160° C. to form a solution containing 25 wt. percent polymer. To this solution is added about 10 grams of boric acid and about 1.5 grams of anhydrous cobalt bromide. A mixture of air and nitrogen gas wherein the total oxygen content is about 5 vol. percent is bubbled through the reaction solution for about 6 hours at atmospheric pressure. The solution is maintained at an average temperature of about 165° C. during the oxidation.

After cooling, the solution is filtered, washed with water and the polymer precipitated by adding acetone. The amount of acetone used is in excess of the amount needed for maximum precipitation. The polymer is dried in vacuum and analyzed. Analysis shows a substantial amount of oxygen introduced into the polymer as hydroxyl groups.

EXAMPLE 3

A copolymer containing as constituent monomers about 94.2 mol percent ethylene and about 5.8 mol percent propylene and having a molecular weight of 255,000 and a melting point of 188° C. is prepared as follows: A catalyst mixture made up of 1.8 grams of aluminum triethyl and 1.44 grams of titanium tetrachloride in 100 ml. of n-heptane is added to 500 ml. of rapidly stirred n-heptane in a 2-liter reactor that has been saturated with a mixture of 94.2 mol percent ethylene and 5.8 mol percent propylene at 65° C., the catalyst components having been mixed and allowed to stand for two hours at room temperature and under a nitrogen atmosphere before adding to the n-heptane solution in the reactor.

After passing the ethylene-propylene mixture (94.2 and 5.8 mol percent respectively) at atmospheric pressure through the reactor for 80 minutes at a rate of 2 liters per minute and at a temperature of 65° C., the gas flow is stopped and a 5 volume percent solution of acetone in n-butyl alcohol is added to the viscous reaction mixture. The slurry is then masticated to a fine state of division. Two liters of isopropyl alcohol are added to the mixture and the resulting mixture is maintained near the boiling point for several hours. Filtration, through washing with isopropyl alcohol and then acetone, and finally vacuum drying at 65° C. and 28 inches of mercury vacuum for 14 hours are carried out in turn. An aliquot of this polymer is oxidized essentially as in Example 2 except that the solvent employed is dibromobenzene, the average temperature of the oxidation is about 175° C., and the pressure is about 5 atmospheres. Analysis of the oxidized polymer reveals that oxidized polymer contains a substantial amount of hydroxyl groups.

EXAMPLE 4

The oxidation process of Example 3 is repeated except for the difference that the polymer feedstock is a high density, isotactic, polypropylene having a viscosity average molecular weight of about 300,000. The pressure during oxidation is maintained at about 10 atmospheres. Analysis of the product reveals that a substantial number of hydroxyl groups are introduced without substantial degradation in molecular weight.

EXAMPLE 5

The oxidation process of Example 1 is repeated except for the difference that trimethyl borate is employed in lieu of $H_3BO_3$ and superatmospheric pressures are employed. Analysis of the product reveals that a substantial number of hydroxyl groups are introduced.

EXAMPLE 6

Polymers are prepared by polymerizing pentene-1, hexene-1, heptene-1, octene-1, and decene-1.

In each of these runs the catalyst is prepared as follows: 2.85 grams of $TiCl_4$ in 20 ml. of n-heptane is added to 110 ml. of n-heptane and heated to 70° C. To this solution is added 0.52 gram $AlEt_3$ in 20 ml. of n-heptane, thus producing an Al/Ti atomic ratio of 0.33/1. Sodium dried heptane is used. The resulting brown mixture is heated for one hour at 70 C. and then added to a polymerization reactor containing 1.5 liters of n-heptane, 2.26 grams of $AlEt_3$ and about 7 grams of the particular olefin to be polymerized. Thus an activated catalyst mixture is obtained containing an Al/Ti atomic ratio of 1.65/1. The catalyst preparation, as well as the actual polymerization, are of course carried out in a dry, inert atmosphere.

After all the catalyst is added, 85 grams of the particular polymerizable olefin are also rapidly added to the polymerization reactor. The mixture slowly rises to 44° C. in about 15 minutes and maintains itself at that temperature by the exothermic heat of reaction as a further amount of about 95 grams (155 grams in the octene run) of the olefin are added dropwise to the reactor over a period of about 40 minutes. (In the case of decene-1 some heating is necessary.) The reaction mixture is stirred for an additional 30 minutes and then quenched by addition to an equal volume of isopropyl alcohol. The heptane is removed from the alcohol-heptane-polymer mixture by evaporation of the liquid and periodic addition of fresh isopropyl alcohol. The isopropyl alcohol is reduced to a minimum volume and the polymer filtered off. The wet polymer is then washed with a slight amount of acetone and dried in a vacuum oven at 60° C. for eight hours. The dried polymers are tacky solids completely soluble in mineral lubricating oils and capable of greatly improving the viscosity index of the latter. The polymerization results are summarized in Table I.

Table I

| Feed Olefin | Pen-tene-1 | Hex-ene-1 | Hep-tene-1 | Oc-tene-1 | Dec-ene-1 |
| --- | --- | --- | --- | --- | --- |
| Polymer Yield, g. | 124 | 135 | 113 | 169 | 76 |
| Olefin Conversion, percent (exclusive of liquid polymer) | 66 | 72 | 61 | 68 | 41 |
| Cat. Eff., g./g. | 22 | 24 | 20 | 30 | 13.5 |
| Polymer Properties: Int. Visc. (In tetralin at 125° C.) | 2.98 | 2.46 | 2.83 | 2.46 | 1.87 |

An aliquot of each of these polymers is oxidized in the presence of boric acid as in Example 2. The oxidized polymer upon analysis is found to contain a substantial number of hydroxyl groups.

EXAMPLE 7

For comparison the first oxidation run of Example 1 is repeated except that the amount of $H_3BO_3$ present is varied. To compare with the 7 wt. percent based on polymer used in Example 1 runs are made with 1 wt. percent, 3 wt. percent, 5 wt. percent and 15 wt. percent. All runs show improvement in preventing polymer degradation over the second run in Example 1 wherein no $H_3BO_3$ or other boric acid compound was employed. Analysis of the products show OH groups introduced. Runs with 3, 5 and 15 wt. percent show a greater improvement over the second run in Example 1 than the run with 1 wt. percent.

It should be understood that the boric acid compound must be present in a readily reactive form. Thus, it may be present as a substance which is a liquid at the reaction conditions, a finely divided solid, or in solution. Fused boric acid compounds, e.g. fused boric oxide, are not satisfactory.

The oxidation of polymers of this type in the presence of boric acid (or other boron compounds hereinbefore disclosed) usually introduces the oxygen into the polymer in the form of a borate ester of the alcohol. The increased selectivity to be observed may at first be thought to be introducing an OH group into the polymer molecule and then immediately esterifying to avoid further reaction. This simple explanation is not satisfactory from the fact that the use of acetic acid or phosphoric acid in place of boric acid does not result in the selective process described in the invention.

What is claimed is:

1. A process for introducing hydroxyl groups into polymers of $C_2$–$C_{12}$ alpha mono-olefin hydrocarbons which comprises contacting said polymers with molecular oxygen at temperatures in the range of about 100 to 250° C. in the presence of about 0.02 to 25 wt. percent of a boron compound based on the weight of said polymers, said boron compound being selected from the group consisting of boric acid, boric oxide, borate esters, alkyl boric acids and esters of alkyl boric acids.

2. A process in accordance with claim 1 wherein said temperature is in the range of 150° to 185° C.

3. A process for introducing hydroxyl groups into crystalline polypropylene which comprises dissolving said polypropylene in an inert solvent and contacting the resulting solution with molecular oxygen at a temperature in the range of about 150° to 185° C. in the presence of about 3 to 10 weight percent of a boron compound based on the weight of said polypropylene, said boron compound being selected from the group consisting of boric acid, boric oxide, borate esters, alkyl boric acids and esters of alkyl boric acids.

4. A process in accordance with claim 3 wherein said inert solvent is selected from the group consisting of benzene, chlorobenzene, bromobenzene, 1,2-dichlorobenzene, 1,3-dichlorobenzene, 1,4-dichlorobenzene, 1,2-dibromobenzene, 1,3-dibromobenzene and 1,4-dibromobenzene.

5. A process in accordance with claim 3 wherein said polypropylene is contacted with said oxygen in the presence of about 0.1 to 10 weight percent of an oxidation catalyst based on the weight of said polypropylene.

6. A process in accordance with claim 1 wherein said polypropylene is contacted with said oxygen in the presence of about 0.1 to 10 weight percent, based on the weight of said polypropylene, of a catalyst selected from the group consisting of cobalt compounds and manganese compounds.

7. A process in accordance with claim 1 wherein said boron compound is $H_3BO_3$.

8. A process for introducing hydroxyl groups into crystalline polyethylene which comprises dissolving said polyethylene in an inert solvent and contacting the resulting solution with molecular oxygen at a temperature in the range of about 150° to 185° C. in the presence of about 3 to 10 weight percent of a boron compound based on the weight of said polyethylene, said boron compound being selected from the group consisting of boric acid, boric oxide, borate esters, alkyl boric acids and esters of alkyl boric acids.

9. A process in accordance with claim 8 wherein said polyethylene is contacted with said oxygen in the presence of about 0.1 to 10 weight percent of an oxidation catalyst based on the weight of said polyethylene.

10. A process in accordance with claim 8 wherein said polyethylene is contacted with said oxygen in the presence of about 0.1 to 10 weight percent, based on the weight of said polyethylene, of a catalyst selected from the group consisting of cobalt compounds and manganese compounds.

11. A process for producing a hydroxylated polymer of $C_2$–$C_{12}$ alpha mono-olefin hydrocarbons, said polymer having a molecular weight of at least about 500, which comprises contacting said polymer with a gas mixture containing an oxidizing amount of molecular oxygen at a temperature in the range of 150° to 185° C. in the presence of an inert solvent and about 3 to 10 weight percent of boric acid based on the weight of said polymer, and recovering the resulting hydroxylated polymer.

12. A process in accordance with claim 11 wherein said gas mixture is air.

13. A process in accordance with claim 11 wherein said polymer is a copolymer of ethylene and propylene.

14. A process for introducing hydroxyl groups into polymers of alpha mono-olefin hydrocarbons which comprises contacting said polymers with molecular oxygen at temperatures up to 250° C. in the presence of a boron compound selected from the group consisting of boric acid, boric oxide, borate esters, alkyl boric acids and esters of alkyl boric acids.

15. A process in accordance with claim 14 wherein the boron compound is boric acid.

16. A process in accordance with claim 14 wherein the boron compound is trimethyl borate.

17. A process for introducing hydroxyl groups into polyethylene which comprises contacting said polyethylene with molecular oxygen at temperatures in the range of about 100 to 250 C. in the presence of about 0.2 to 20 wt. percent of a boron compound based on the weight of said polyethylene, said boron compound being selected from the group consisting of boric acid, boric oxide, borate esters, alkyl boric acids and esters of alkyl boric acids.

18. A process for introducing hydroxyl groups into polypropylene which comprises contacting said polypropylene with molecular oxygen at temperatures in the range of about 100 to 200° C. in the presence of about 0.2 to 20 wt. percent of a boron compound based on the weight of said polypropylene, said boron compound being selected from the group consisting of boric acid, boric oxide, borate esters, alkyl boric acids and esters of alkyl boric acids.

19. A process for introducing hydroxyl groups into a copolymer of ethylene and propylene which comprises contacting said copolymer with molecular oxygen at temperatures in the range of about 100 to 250° C. in the presence of about 0.2 to 20 wt. percent of a boron compound based on the weight of said copolymer, said boron compound being selected from the group consisting of boric acid, boric oxide, borate esters, alkyl boric acids and esters of alkyl boric acids.

References Cited in the file of this patent

FOREIGN PATENTS 581,279     Great Britain _____ Oct. 7, 1946

OTHER REFERENCES

Chemical Reviews (August 1957), vol. 57, No. 4, pp. 717–718.